← One frame →

| | Field 1 | Field 2 | Field 3 | Field 4 | Field 5 | Field 6 | Field 7 | Field 8 |
|---|---|---|---|---|---|---|---|---|
| Line 1 | Red | | | | | | | |
| " 2 | | Green | | | | | | |
| " 3 | | | Blue | | | | | |
| " 4 | | | | Green | | | | |
| " 5 | | | | | Red | | | |
| " 6 | | | | | | Green | | |
| " 7 | | | | | | | Blue | |
| " 8 | | | | | | | | Green |
| " 9 | Red | | | | | | | |
| " 10 | | Green | | | | | | |
| " 11 | | | Blue | | | | | |
| " 12 | | | | Green | | | | |

Inventor
Donald Weighton
By Emery Holcombe & Blair
Attorney

March 13, 1956 D. WEIGHTON 2,738,377

COLOR TELEVISION

Filed March 24, 1952 2 Sheets-Sheet 2

Inventor

Donald Weighton

By Emery Holcombe & Blair

Attorney 2,738,377
Patented Mar. 13, 1956

2,738,377

COLOR TELEVISION

Donald Weighton, Cambridge, England, assignor to Pye Limited, Cambridge, England, a British company Application March 24, 1952, Serial No. 278,196
Claims priority, application Great Britain March 27, 1951
13 Claims. (Cl. 178—5.2)

It is well-known that the acuity of human vision is greatest for light of wavelength corresponding to green or greenish-yellow, and is lower for light towards the red or blue ends of the visible spectrum. In order to utilise the band width of a colour television transmission to the best advantage, it is therefore desirable in any three colour system to reproduce the green image with greater definition than that afforded to the red and blue images. In field sequential systems it has not so far been possible to do this as the band width afforded to each of the three colours must necessarily be the same since the three coloured images are transmitted successively in time. The present invention provides a field sequential system in which the definition of the green image is made greater than that of the red and blue images by providing the green image with a greater number of scanning lines. By this means an optimum utilisation of band width is obtained.

A further object of the invention is to achieve, by a field sequential system, a transmission in which the optimum colour balance is obtained both when the transmission is received on a colour receiver or on a monochrome receiver. Thus one of the major problems in transmitting a programme for reception on both colour and monochrome receivers is that, in the former case, it is desirable to reproduce all objects in the original scene with a brightness proportional to their actual brightness irrespective of colour, whereas in the latter case, it is desirable to reproduce the brightness of each part of the scene as a function of its colour and in a manner following the response curve of an average human eye. The system according to the present invention enables both these requirements to be satisfied simultaneously with sufficient accuracy.

One manner in which the invention may be carried into effect will now be described with reference to the accompanying drawing, in which.

Figures 1, 3:
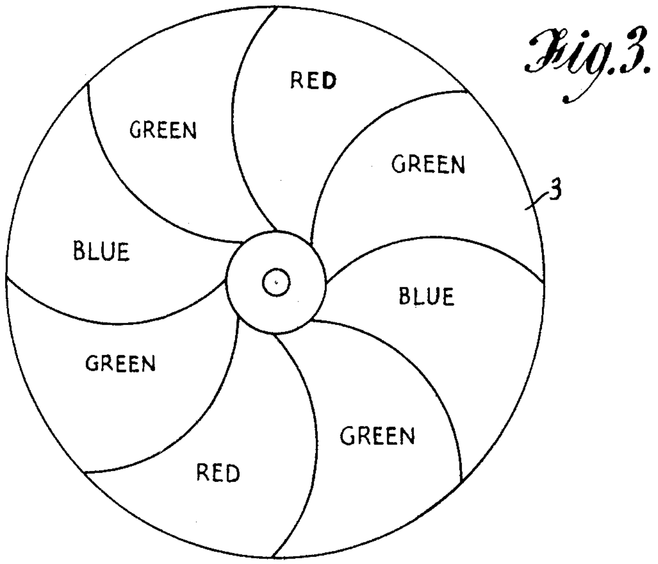
Figure 1 shows diagrammatically the sequence of the scanning operations.
Figure 3 shows the arrangement of the colour filters on the filter disc.

Referring to the drawings, the camera pick-up tube 1 at the transmitting station and the receiving cathode ray tube 2 at the receiving station, are each provided with means for changing the colour of successive fields, shown as rotating colour filter discs 3, **3*a***. Each disc comprises a plurality of colour filter sections so arranged, as shown in Figure 3, that as the disc is rotated the sequence of colours of successive fields will be red, green, blue, green, red, green, blue, green and so on, it being understood that the terms "red", "blue" and "green" refer to filters which will be predominantly of these colours but which will in practice be designed to have such transmission characteristics as may be necessary to permit faithful reproduction of any range of colours.

At the transmitter the raster is scanned with an eight-fold interlace by the camera scan generator 4 and scanning coils 5, the scanning generator being controlled from the waveform generator 6, which is also used to maintain the synchronous motor 7 driving the disc 3 in correct phase with the scanning by means of the phase locking control 8. The video output from the pick-up tube 1 is fed to the video amplifier and mixer 9 where the video output is mixed with the blanking and synchronising pulses from the generator 10, which is also controlled from the waveform generator 6. The output from the video amplifier 9, constituting the complete television waveform, is fed to the television transmitter 11 and the transmitting antenna.

At the receiving station, the signals received at the receiving antenna are fed to the television receiver 12. The video output is fed to the modulating electrode 13 of the cathode ray tube 2. The synchronising signals are separated in the synchronising separator 14 and are fed to control the cathode ray tube scan generator 15, which, in conjunction with the scanning coils 16, causes the raster of the cathode ray tube to be scanned with an eight-fold interlace. The synchronising pulses from the synchronising separator are also fed to the phase locking control 17 for maintaining the synchronous motor 18 which drives the colour filter disc **3*a* in phase with the colour filter disc 3** at the transmitter.

As mentioned above, the raster at both the transmitter and the receiver is scanned with an eight-fold interlace and, since the colour sequence comprises four elements, it repeats with the same colour on corresponding fields in successive frames. Each line is therefore scanned with one colour only, as illustrated in Figure 1. For example, if the total number of lines is 801 and the field frequency is 200 cycles per second, then each field will contain 100⅛ lines and there will be 25 frames per second. Of the total of 801 lines, 400½ lines will be green, 200¼ red and 200¼ blue, the green raster being formed by a four-fold interlace with a flicker rate of 100 cycles per second and the red and blue rasters by a two-fold interlace with a flicker rate of 50 cycles per second. In this example, the line scan frequency required will be approximately 20 kilocycles per second and the band width about 6 megacycles per second for adequate definition along the direction of the scanning lines.

Since the time devoted to transmission of the green image is twice that devoted to the red or blue images, the green image will appear relatively too bright unless the light attenuation of the green filter is doubled. This is to be preferred to reduction of the amplitude of the green signal by 50%, since it is desirable always to utilise the maximum power available at the transmitter in order to minimise the noise level. If the signal is received on a monochrome receiver, then the green image will appear twice as bright as the red or blue images, thus giving an overall system characteristic similar to that of an average human eye.

Figure 2:
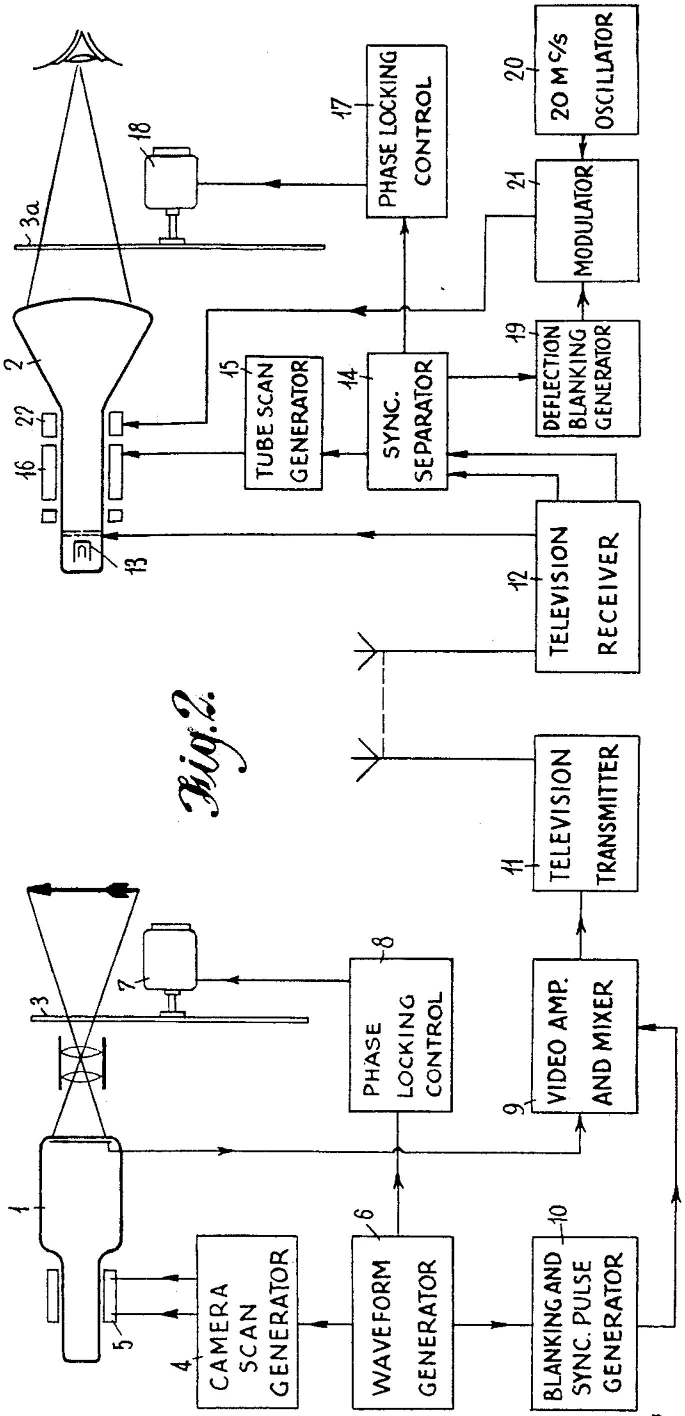
Figure 2 shows a circuit diagram of the transmitter and receiver according to the invention.

In order to reduce the visibility of the line structure of the red and blue images, it may be desirable to elongate the scanning spot in a direction normal to the lines during the red and blue fields. This may be achieved by applying a high frequency deflection in a known manner to the cathode ray tube beam, said high frequency deflection being modulated by a square wave of half the field frequency so that it is switched off during the scanning of the green raster. In the embodiment illustrated in Figure 2, this is achieved by using the output from the synchronising separator 14 to control the deflection blanking generator 19 which produces the square wave of half the field frequency. The high frequency deflection current is produced by the 20 megacycle oscillator 20, the output from which, and the output from the blanking generator 19, being both fed to the modulator 21, the output of which feeds the additional deflecting coil 22 associated with the cathode ray tube for deflecting the scanning spot in a direction normal to the scanning lines.

I claim:

1. In a colour television transmitter the combination comprising a pick-up tube, means for scanning said pick-up tube in eight-fold interlaced field scansions, and means for rendering said pick-up tube responsive to the different colour components of the image to be transmitted during successive field scanning periods of each eight-fold interlaced field scansion in the order red, green, blue, green, red, green, blue, green.

2. Apparatus as claimed in claim 1, wherein the pick-up tube is illuminated by the image to be transmitted through a rotating colour filter bearing colour filter elements arranged in the order red, green, blue, green.

3. In a colour television system, means for scanning the image to be transmitted in eight-fold interlaced field scansions, means for producing output signals during successive field scanning periods corresponding to the different colour components of the image to be transmitted and in the order red, green, blue, green, red, green, blue, green, and means for reproducing the composite signal on the screen of a reproducing device, the successive fields being viewed through colour filters in the sequence red, green, blue, green, red, green, blue, green, synchronised to correspond to the colour components of the successive fields transmitted.

4. In a colour television receiver for reproducing an eight-fold interlaced field sequential colour television signal of which successive fields correspond in sequence to the red, green, blue, green, red, green, blue, green, components of the picture, a cathode ray tube, means for scanning the cathode ray tube with a raster having an eight-fold interlace, means for viewing the raster through a rotating colour filter disc carrying filters arranged in the order red, green, blue, green, and means for synchronising the rotating colour filter with the received waveform.

5. Receiver as claimed in claim 4, wherein means are provided for elongating the scanning spot in a direction normal to the scanning lines of the raster during the field scansions corresponding to the red and blue components of the picture.

6. A colour television transmitter comprising in combination, a pickup tube, means for scanning said pickup tube in eight-fold interlaced sequential field scansions, means for rendering said pickup tube responsive during successive fields to colour components in the sequence red, green, blue, green, red, green, blue, green, a waveform generator, for generating a waveform controlling the generation of said field scans and controlling the means for sequentially rendering said pickup tube responsive to the different colour components, means controlled by said waveform generator for generating synchronising and blanking pulses, means for mixing the video output of said pickup tube with said synchronising and blanking pulse and means for transmitting said mixed waveform.

7. A colour television transmitter comprising in combination, a pickup tube, means for scanning said pickup tube in eight-fold interlaced sequential field scansions, a rotatable colour filter positioned in front of said pickup tube, and bearing colour filter elements in the sequence red, green, blue, green, red, green, blue, green, for illuminating said pickup tube during successive fields sequentially with said colour components a waveform generator for generating a waveform controlling the generation of the eight-fold interlaced field scansions and controlling the rotation of the colour filter for sequentially illuminating said pickup tube with the different colour components during successive fields of said eight-fold scansion, means controlled by said waveform generator for generating synchronising and blanking pulses, means for mixing the video output of said pickup tube with said synchronising and blanking pulse and means for transmitting said mixed waveform.

8. A colour television receiver for reproducing an eight-fold interlaced field sequential colour television signal of which successive fields correspond in sequence to the red, green, blue, green, red, green, blue, green components of the picture, comprising means for receiving said television signal, a cathode ray tube, means for scanning said cathode ray tube with an eight-fold interlaced sequential field scan, colour selection means associated with said cathode ray tube, for causing said cathode ray tube to reproduce colours in the order red, green, blue, green, red, green, blue, green, and means for synchronizing the change in the colour selection means with the sequential fields in each eight-fold interlaced field scansion.

9. A colour television receiver for reproducing an eight-fold interlaced field sequential colour television signal of which successive fields correspond in sequence to the red, green, blue, green, red, green, blue, green components of the picture comprising means for receiving said television signal, a cathode ray tube means for scanning said cathode ray tube with an eight-fold interlaced sequential field scan, means for viewing the raster through a rotating colour filter changing colour in the order red, green, blue, green, red, green, blue, green, means for synchronizing the change in the colour filter with the sequential fields in each eight-fold interlaced field scansion means for producing a high frequency oscillation and means for applying said high frequency oscillation to elongate said scanning spot in a direction normal to the scanning lines during the fields corresponding to the red and blue components of the picture.

10. A colour television system comprising in combination, a pickup tube, means for scanning said pickup tube in eight-fold interlaced sequential field scansions means for rendering said pickup tube responsive during successive fields to colour components in the sequence red, green, blue, green, red, green, blue, green, a waveform generator, for generating a waveform controlling the generation of said field scans and controlling the means for sequentially rendering said pickup tube responsive to the different colour components, means for transmitting the output signal from said pick-up tube, means for receiving said transmitted signal, a cathode ray tube, means for scanning said cathode ray tube with an eight-fold interlaced sequential field scansion, colour selection means associated with said cathode ray tube for causing said cathode ray tube to reproduce colours in the order red, green, blue, green, red, green, blue, green and means for synchronising the scanning means for the cathode ray tube and the change in the colour selection means with the sequential fields in each eight-fold interlaced field scansion at the transmitter.

11. For a colour television system, a colour filter comprising a plurality of transparent segments in the colours red, blue and green, said segments being arranged respectively in the sequence red, green, blue, green, red, green, blue, green, and means for supporting said filter for movement of said segments successively passed a fixed point.

12. A colour filter disc, comprising a plurality of transparent filter segments in the colours red, blue and green, said segments being arranged sequentially in the order red, green, blue, green, red, green, blue, green, and means whereby said filter disc may be rotated about its axis.

13. A colour filter disc comprising eight transparent filter segments in the colours red, blue and green, said segments being arranged sequentially about the axis of said disc in the order red, green, blue, green, red, green, blue, green and means whereby said filter disc may be rotated about its axis.

References Cited in the file of this patent

UNITED STATES PATENTS

| | | |
|---|---|---|
| 2,378,746 | Beers | June 19, 1945 |
| 2,446,791 | Schroeder | Aug. 10, 1948 |
| 2,558,489 | Kalfaian | June 26 1951 |
| 2,579,971 | Schade | Dec. 25, 1951 |
| 2,692,532 | Lawrence | Oct. 26 1954 |